Patented July 17, 1923.

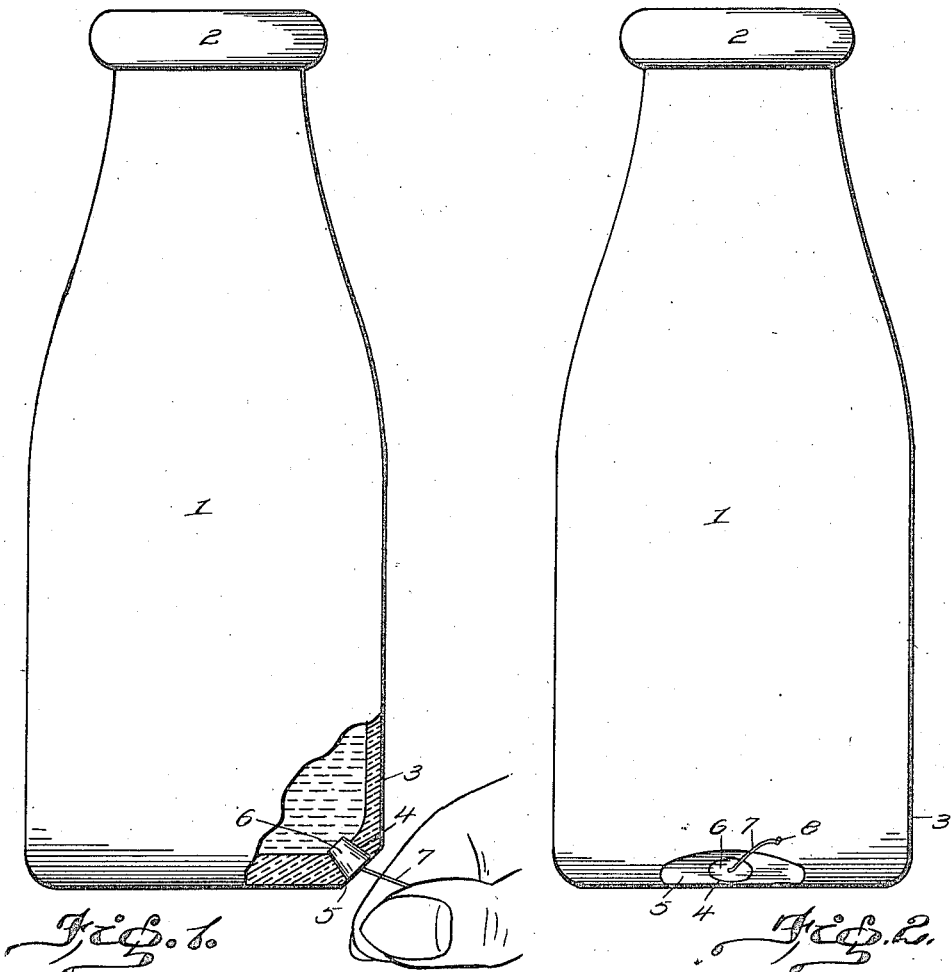
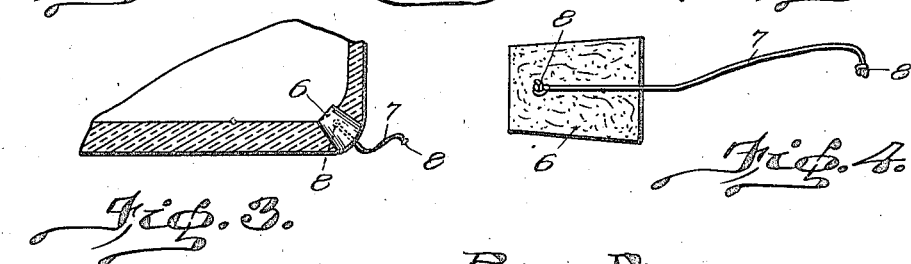

1,462,330

UNITED STATES PATENT OFFICE.

RAY DUNN, OF TIPTON, IOWA.

MILK BOTTLE.

Application filed May 6, 1922. Serial No. 559,021.

*To all whom it may concern:*

Be it known that I, RAY DUNN, a citizen of the United States, residing at Tipton, in the county of Cedar and State of Iowa, have invented certain new and useful Improvements in Milk Bottles, of which the following is a specification.

This application has reference to improvements in milk bottles and its object is to effect the ready separation of the cream from the milk whereby the cream line may be lowered toward the bottom of the bottle and the cream may then be poured off from the top of the bottle, without liability of mixing the cream with the milk in the bottle.

In accordance with the invention, the milk bottle is furnished at the lower end with a stopper or closure from which the milk below the cream line may be withdraw and the cream may then be poured from the upper end or mouth of the bottle without mixing of the cream and milk but keeping the cream positively separated from the milk.

In accordance with the invention, the milk bottle is furnished with an orifice at its lower end and there provided with a stopper by which the milk may be readily separated by allowing the uncontaminated milk to flow from the bottom of the bottle without intermixture or other contamination with the cream already in the bottle.

In accordance with the invention, there is provided a small passage for the escape of the milk and this passage is normally closed by means of a stopper having a cord or other handling device permitting the withdrawal of the stopper for the removal of the milk without disturbing the level of the cream to the extent of causing it to mix with the milk in the lower end of the bottle.

Surrounding the orifice in the bottom of the bottle is a relatively flat surface permitting the flush introduction of the stopper without any bulging projection of the latter.

The invention will be best understood from a consideration of the following detailed description taken in connection with the accompanying drawings forming part of this specification, with the understanding that the invention is not confined to any strict conformity to the showing of the drawings, but may be changed and modified so long as such changes and modifications mark no material departure from the salient features of the invention as expressed in the appended claims.

Fig. 1 is an elevation, with some parts in section, of a milk bottle containing the invention, Fig. 2 is an elevation at right angles to the showing of Fig. 1 and showing the stopper and extracting cord in place, Fig. 3 is a fragmentary section through the structure shown in Fig. 1, Fig. 4 is a detailed section of the cork or stopper employed in connection with the bottle.

Referring to the drawings, there is shown a bottle 1 of generally the same construction as is employed in connection with milk bottles and comprises a neck portion 2 and a bottom portion 3, through which bottom portion is formed a passage 4 having an exteriorly flat surface 5, through which the passage 4 is formed.

The flattened surface 5 is pierced by the passage designed to receive the stopper 6 to which is secured a cord 7 having terminal knots or enlargements 8, facilitating the withdrawal of the cork or stopper when so desired.

The bottle 1 may be and preferably is similar in shape to ordinary commercial milk bottles and may be made in the various sizes in which such bottles are manufactured.

Because of the flattened surface 5 the cork or stopper will fit flush with the bottle without producing any extending edges, although the bottle may be made so that a stopper with a convex face may be used, instead of the flat face.

The hole being designed to receive the stopper or cork 6 is preferably tapered and the stopper may be made from any sanitary material which is preferably paraffined or paraffine treated and constructed of pressed paper to fit the hole 5.

By restricting the length of the cord, it will not interfere with the use of the bottle, but still provides sufficient length of cord to allow of firm grasp by the fingers of the human hand.

In the use of the bottle, the cork may be extracted and the milk be permitted to flow from the bottle until the cream line is reached, such cream appearing at the orifice 4, and then the bottle may be tipped in the other direction sufficiently to allow the cream to flow through the mouth 2 of the bottle into a suitable receptacle.

In this manner the cream is very effectively separated from the milk from which the cream has been removed by the usual separating process.

It is preferred that the bottom of the bottle be thickened and the outside flush at the point where the stopper receiving opening is made.

The milk bottle is particularly sanitary in employing a nonmetallic stopper which is to be used once and then thrown away. The angle of the hole in which the stopper is lodged insures the positive directing of the milk stream into a milk container.

The milk bottle represents economy and practicability in holding the milk and in the washing of the bottle and saves room for the cooling and handling of the milk.

The improved milk bottle is more practical than other such containers, being quickly operated, quickly cleansed, and is no more expensive than the ordinary commercial bottle, being correct in design and absolutely sanitary.

What is claimed, is:—

1. The combination with a bottle-like container having an inclined orifice tapered with respect to the horizontal and the vertical, of a removable tapered stopper having its longitudinal central axis inclined in like manner to both the central and transverse axis of the bottle and located at the lower diagonal corner of the bottle.

2. The combination with a bottle-like container having a tapered orifice inclined to both the upright and horizontal axis of the container, of a tapered stopper having its longitudinal central axis inclined to both the central and transverse axis of the bottle and having the tapered stopper provided with an anchored pulling strand inserted in said stopper and accessible at the large end of the stopper, with the axis of pulling intermediate of both the horizontal and the vertical planes of the container.

3. The combination with a bottle-like container having an inclined tapered orifice shaped to receive a tapered stopper having its longitudinal central axis inclined to both the central and transverse axes of the bottle and located at the lower corner of said bottle, of a tapered stopper provided with an anchored pulling strand embedded in said stopper and accessible at the large end of the stopper, said stopper being composed of layers of pressed paraffin paper and embedding the pulling strand.

4. The combination with a bottle-like container having an inclined tapered orifice, of a tapered stopper having its longitudinal central axis inclined to both the central and transverse axes of the bottle and located at the lower corner of said bottle, the outer face of the bottle where traversed by the tapered orifice having a plane at an angle to the longitudinal and transverse axes of the bottle.

In testimony whereof, I affix my signature hereto.

RAY DUNN.